United States Patent
Kinmartin et al.

(10) Patent No.: US 9,724,978 B2
(45) Date of Patent: Aug. 8, 2017

(54) HVAC MODULE HAVING AN OPEN ARCHITECTURE

(71) Applicant: MAHLE International GmbH, Stuttgart (DE)

(72) Inventors: Jeffrey C. Kinmartin, East Amherst, NY (US); Prasad S. Kadle, Williamsville, NY (US); Mingyu Wang, Amherst, NY (US); Debashis Ghosh, Williamsville, NY (US); Steven M. Zielinski, N. Tonawanda, NY (US); Shamsuddin Noorani, Lockport, NY (US)

(73) Assignee: MAHLE International GmbH, Stuttgart (DE)

( * ) Notice: Subject to any disclaimer, the term of this patent is extended or adjusted under 35 U.S.C. 154(b) by 213 days.

(21) Appl. No.: 14/685,933

(22) Filed: Apr. 14, 2015

(65) Prior Publication Data
US 2016/0303941 A1     Oct. 20, 2016

(51) Int. Cl.
*B60H 1/00*     (2006.01)
*F24F 1/02*     (2011.01)

(52) U.S. Cl.
CPC ..... *B60H 1/00021* (2013.01); *B60H 1/00064* (2013.01); *F24F 1/022* (2013.01); *B60H 1/00028* (2013.01); *B60H 1/00035* (2013.01); *B60H 2001/002* (2013.01); *B60H 2001/00092* (2013.01); *B60H 2001/00135* (2013.01); *B60H 2001/00185* (2013.01); *B60H 2001/00192* (2013.01)

(58) Field of Classification Search
CPC ............ B60H 1/00021; B60H 1/00028; B60H 1/00064; B60H 1/00035; B60H 2001/00092; B60H 2001/00135; B60H 2001/00185; F24F 3/14; F24F 1/022; F28D 5/02
USPC ........................................................ 165/203
See application file for complete search history.

(56) References Cited

U.S. PATENT DOCUMENTS 5,228,475 A    7/1993   Trill
5,983,657 A   11/1999   Murata et al.
(Continued)

FOREIGN PATENT DOCUMENTS

EP        2 030 816 A2      3/2009

OTHER PUBLICATIONS

U.S. Appl. No. 14/282,173, filed May 20, 2014.

*Primary Examiner* — Davis Hwu
(74) *Attorney, Agent, or Firm* — Brinks Gilson & Lione

(57) ABSTRACT

An open architecture HVAC module is disclosed having a housing defining an air inlet and at least two adjacent air outlets. An evaporator and a heater unit are disposed within the housing. A cold air chamber is defined between the evaporator and heater unit, and a hot air chamber is defined downstream of the heater unit. A partition extends into the cold and hot air chambers from an interior surface of the housing between the two adjacent air outlets. The partition is spaced from the evaporator and heater unit. The partition cooperates with the housing to define a first mixing chamber in fluid communication with the first outlet and a second mixing chamber in fluid communication with the second outlet. A blend valve is disposed in each mixing chambers. The blend valves are configured to selectively direct air flow from the cold and hot air chambers to the air outlets.

12 Claims, 5 Drawing Sheets

(56) References Cited

U.S. PATENT DOCUMENTS

| | | | |
|---|---|---|---|
| 6,178,767 B1* | 1/2001 | Pravda | F28D 5/02 62/310 |
| 6,293,339 B1 | 9/2001 | Uemura et al. | |
| 6,368,207 B1 | 4/2002 | McLaughlin et al. | |
| 6,547,152 B1 | 4/2003 | Pawlak, III | |
| 6,772,833 B2 | 8/2004 | Auer et al. | |
| 6,772,822 B2 | 10/2004 | Wu et al. | |
| 7,174,918 B2 | 2/2007 | Stevenson et al. | |
| 7,478,670 B2 | 1/2009 | Richter et al. | |
| 7,832,464 B2 | 11/2010 | Kinmartin et al. | |
| 2002/0129933 A1 | 9/2002 | Ozeki et al. | |
| 2003/0205055 A1* | 11/2003 | Shahbaz | F24F 3/14 62/331 |
| 2003/0234098 A1* | 12/2003 | Huang | B60H 1/00028 165/43 |
| 2008/0200110 A1 | 8/2008 | Ghosh et al. | |

\* cited by examiner

# HVAC MODULE HAVING AN OPEN ARCHITECTURE

TECHNICAL FIELD OF INVENTION

The invention relates to a heating, ventilation and air conditioning (HVAC) module for a passenger vehicle; more specifically, to an HVAC module configured to provide conditioned air to multiple temperature-controlled zones within the passenger compartment of the vehicle.

BACKGROUND OF THE INVENTION

Traditional motor vehicles typically have a single temperature-controlled zone air conditioning system designed to provide conditioned air to the front occupants in the passenger compartment of the vehicle. As the size of the vehicles increases, and as vehicle occupants demand more luxurious features, air conditioning systems capable of providing multiple temperature-controlled zones, or multi-zone air conditioning systems, have become more prevalent. A multi-zone air conditioning system allows the driver, front passenger, and even the rear seat passengers to have separate controls of the temperature in their respective zone, thereby maximizing the comfort of the occupants in each zone. A larger size vehicle, such as suburban utility vehicles (SUV) and mini-vans, may have up to four or more individual zones in the passenger compartment. As an example, the passenger compartment of a mini-van may be divided into four separate zones, where the driver space may be zone 1, the front passenger space may be zone 2, the second row seating space may be zone 3, and the third row seating space may be zone 4.

Traditional heating, ventilation and air conditioning (HVAC) modules for single zone air conditioning systems are generally designed to optimally utilize the amount of available space in a given type of vehicle as well as to conform to the shape of that space. HVAC modules that have the capability of providing temperature control for multiple zones are specifically designed, tooled, and manufactured for the exact number of zones. The production volume for multiple zone HVAC modules is typically much lower than that for single or dual zone modules. As such, it is much more expensive to design such a multiple zone HVAC module for so few vehicles. Additionally, it would be disruptive to the manufacturing cell and the manufacturing process in general to be forced to build an entirely different HVAC module to achieve an additional temperature-controlled zone.

Traditional multiple zone HVAC modules use partition walls extending up to the individual heat exchangers within the HVAC module to provide multiple streams of conditioned airflow. These multiple streams of airflow are used to achieve multi-zone climate control in the associated passenger compartments. The greater the number of zones, the greater number of partition walls are required, and the larger the sizes of heat exchangers are required. However, multiple zone HVAC modules must conform to the limited size and shape of a where a single zone HVAC module would be in place, thereby requiring additional functions to be added without utilizing any extra space. Due to operating capacity and packaging constraints, two separate dual HVAC modules are occasionally employed in larger vehicles to achieve multi-zone operation, where a two zone module is installed in the area of the vehicle dash and another, one or two zone, HVAC module in the area of the trunk.

However, implementation of the traditional, partitioned, dual HVAC modules, one under the dash and the other in the trunk, is cumbersome and costly. For example, dual HVAC modules can require excessive packaging space in the host vehicle, additional air ducts, additional lines and fittings, additional refrigerant, additional coolant, additional mass, higher operating noise levels, higher cost and increased system complexity that often translates into elevated quality and warranty issues. Such systems require additional energy and larger supporting components such as compressors, water pump, condenser, alternator, line sets, and ducts. As a consequence, the dual module approach results in increased vehicle fuel consumption and increased exhaust emissions. All of these items significantly contribute to overall vehicle cost and operating costs.

Based on the foregoing, there exists a need for an HVAC module capable of providing multiple temperature-controlled zones for a passenger vehicle, in which the HVAC module is sufficiently compact to reside within the dash of the vehicle.

SUMMARY OF THE INVENTION

The present disclosure provides an open architecture HVAC module having a housing defining an air inlet and at least two adjacent air outlets. A first heat exchanger is disposed within the housing downstream of the air inlet and a second heat exchanger is disposed within the housing downstream of the first heat exchanger. A cold air chamber is defined in the housing between the first heat exchanger and the second heat exchanger, and a hot air chamber is defined in the housing between the second heat exchanger and an interior surface of the housing downstream of the second heat exchanger. A partition extends into the first air chamber and the second air chamber from an interior surface of the housing between the two air outlets, wherein the partition is spaced from the first heat exchanger and the second heat exchanger such that each of the first air outlet and the second air outlet are in fluid communication with both of the first air chamber and the second air chamber. The partition wall cooperates with the housing to define a first mixing chamber in fluid communication with the first outlet on one side of the first partition wall and a second mixing chamber in fluid communication with the second outlet the other side of the first partition wall. Both the mixing chambers are in fluid communication with the first air chamber and the second air chamber. A blend valve is disposed in each of the mixing chambers, wherein the blend valves are configured to selectively direct air flow from the first air chamber and the second air chamber to the first air outlet.

In yet another aspect of the invention, an HVAC module is provided having a housing defining an air inlet, a first mixing chamber having a first outlet, and a second mixing chamber having a second outlet. A first blend valve is disposed in the first mixing chamber and a second blend valve is disposed in the second mixing chamber. An evaporator is disposed in the housing downstream of the air inlet and a heater unit is disposed in the housing downstream of the evaporator. The housing defines a cold air chamber immediately downstream of the evaporator and a hot air chamber immediately downstream of the heater unit. The first and second blend valves are configured to selectively direct air flow from the cold air chamber and the hot air chamber to the first and second air outlets, respectively. The HVAC module requires no more than one blower assembly necessary to induce air flow through the housing from the inlet to at least one of the outlets.

Advantages of the improved HVAC module includes, but not limited to, greater total capacity utilization of the heat exchangers for the conditioning of air to the vehicle occupants, ability to provide temperature controlled air to one or more zones, ability to provide variable air flow to one or more zone, ability to provide super cooling or super heating to any one zone, and the capability of requiring only a single blower assembly.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

The following documents are hereby incorporated by reference in their in their entireties to describe the making and using of an HVAC module: U.S. Pat. No. 7,832,464 B2 to Kinmartin et al. entitled "Flexible Module with Add-On Multi-Zone Sub-Assembly"; U.S. Pat. No. 7,174,918 B2 to Stevenson et al. entitled "Air Flow Control Valve for Vehicle Air Conditioning Module"; U.S. Pat. No. 6,772,822 B2 to Auer et al. entitled "HVAC with Modular Inserts"; U.S. Pat. No. 6,547,152 B1 to Pawlak III entitled "Vehicle Heating Ventilation and Air-Conditioning Module for Improved Heating and Defrosting Performance"; U.S. Pat. No. 6,368,207 B1 to McLaughlin et al. entitled "Automotive Heating, Ventilating and Air Conditioning Module with Improved Air Mixing"; U.S. Pat. No. 5,983,657 to Murata et al. entitled "Air Conditioning System"; and U.S. Pat. No. 5,228,475 to Trill entitled "Air Flow Control Valve for a HVAC Module".

Figure 1:
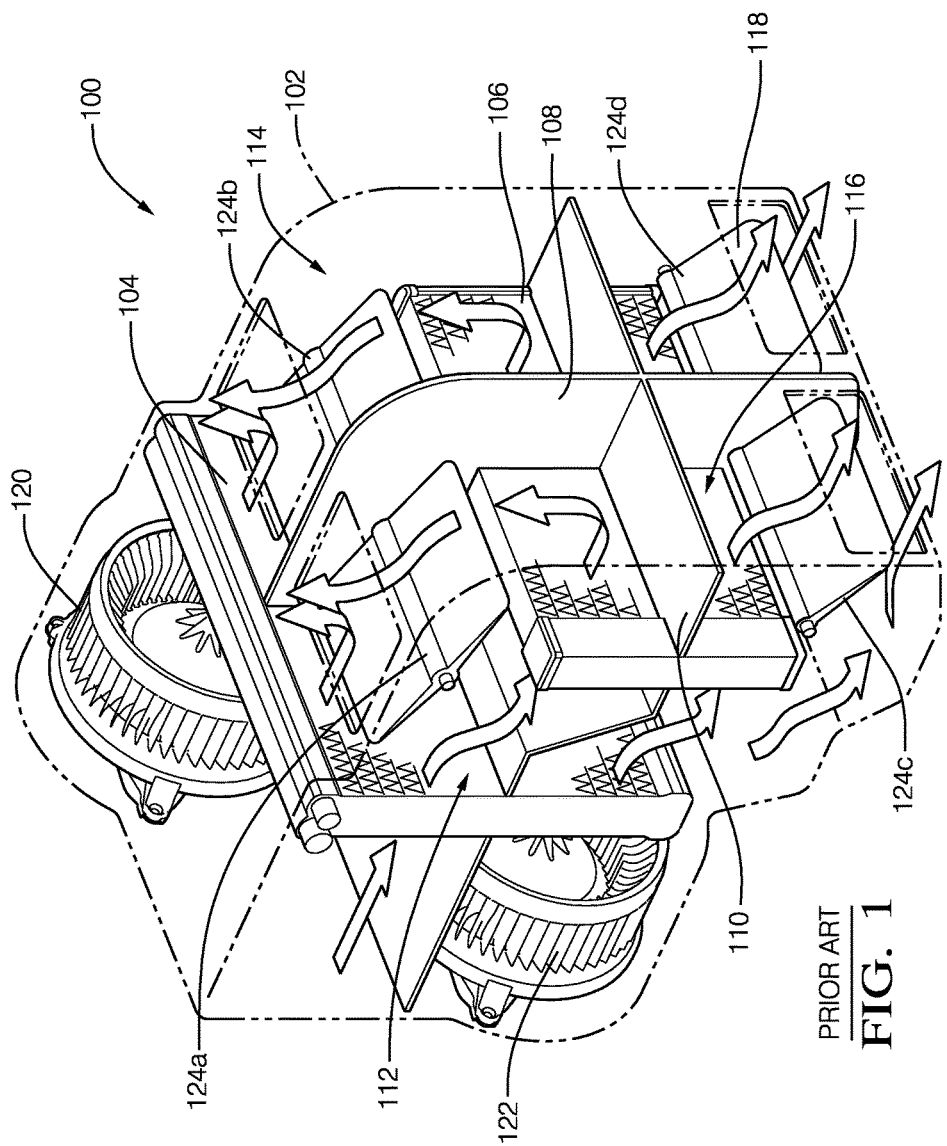
FIG. 1 is a simplified perspective view of a prior art HVAC module.
Figure 2:
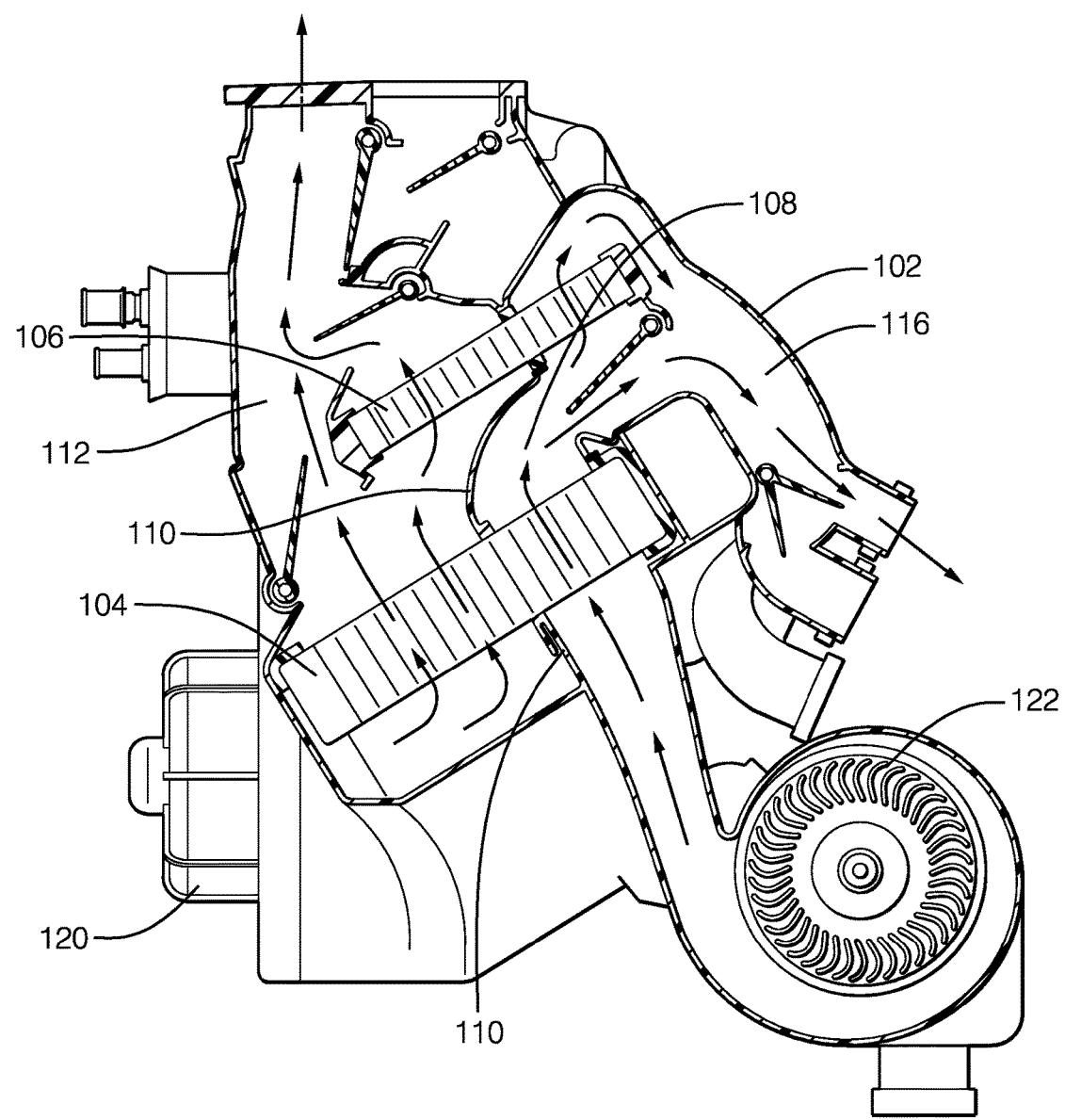
FIG. 2 is a prior art HVAC module embodying the features of the HVAC module of FIG. 1.

Shown in FIGS. 1 and 2 is a prior art HVAC module 100 configured to provide conditioned air to multiple temperature controlled zones within the passenger compartment of a motor vehicle. FIG. 1 presents a simplified drawing of the prior art HVAC module 100 for clarity of explanation of the main features and operations of the prior art HVAC module 100. FIG. 2 shows a known prior art HVAC module 100 encompassing the features shown in FIG. 1. Where practical, reference numbers for like components are commonly used among FIGS. 1 and 2. The prior art HVAC module 100 shown is configured to provide conditioned air to four (4) separate temperature controlled zones. The first zone may be that of the driver space, the second zone may be that of the front passenger space, the third zone may be that of the second row of passenger seating space, and the fourth may be that of the third row of passenger seating space of a larger vehicle such as a minivan. As an alternative, the third and fourth zones may be that of the left and right rear seating space.

The prior art HVAC module 100 includes an HVAC housing 102 containing a first heat exchanger 104, such as an evaporator 104 for cooling an air stream, and a second heat exchanger 106, such as a heater unit 106, for heating an air stream. The interior volume of the HVAC housing 102 is partitioned by vertical and horizontal partition walls 108, 110 into four (4) separate and distinct mixing chambers 112, 114, 116, 118 for providing custom conditioned air to each of the four zones. The partition walls 108, 110 extend through the heat exchangers 104, 106, effectively partitioning each of the heat exchangers 104 into four quadrants. The partition walls 108, 110 cooperates with the HVAC housing 102 to define the four air mixing chambers 112, 114, 116, 118 and associated passageways through the HVAC module 100 to convey conditioned air for the individual zones. A blend valve 124a, 124b, 124c, 124d is disposed in each mixing chamber to selectively blend air exiting from each of the heat exchangers 104 to provide conditioned air having the desired temperature as controlled by each of the respective zones.

The prior art HVAC module 100 requires two separate blowers 120, 122 to draw air into the HVAC module 100 to be conditioned and conveyed to the individual zones. The first blower 120 is provided to draw air into the upper portion of the HVAC module 100 and deliver air to the first and second zones, and the second blower 122 is provided to draw air into the lower portion of the HVAC module 100 and deliver air to the third and fourth zones. The mass flow rate and velocity of air flow to each zone may be controlled by the combination of blower speed and manual airflow valves provided in the vent outlet to each of the zones. In general, the front two zones will have the same airflow and the rear two zones will have the same airflow exiting the HVAC module 100.

Each of the four mixing chambers 112, 114, 116, 118 is dedicated to a particular zone, such that each zone is only utilizing a quadrant of each of the heat exchangers 104, 106. The heat exchangers 104, 106 are partitioned in such a way that air flowing through a quadrant of the core of each heat exchangers 104, 106 does not cross communicate with airflow through another quadrant of the respective heat exchanger. The partition walls 108 may extend up to the heat exchangers 104 and through the heat exchangers 104, 106, or the heat exchangers 104, 106 may be partitioned by closing off the fins or by using a mastic sealer in the spaces of the core delineating the boundary between quadrants to prevent cross air flow from one zone to another.

Shown in FIG. 2 is a cross sectional view of a known prior art HVAC module 100 having four mixing chambers 112, 114, 116, 118 for providing conditioned air to four separate temperature controlled zones. Only the first and third chambers 112, 116 are shown, the second and fourth chambers 114, 118 are hidden behind the vertical partition wall 108. Referring to FIG. 2, to provide independent airflow volume to the front passenger area, zone 1, and second row seating, zone 3, the evaporator 104 is partitioned into a front and rear zone by a horizontal partition wall 110. The partition walls 108, 110 extends to and may partition both heat exchangers 104, 106 as described above.

Since each section of the respective heat exchanger 104, 106 is dedicated only to a particular zone, this results in an inefficient usage of the heat exchangers 104, 106 especially the evaporator 104. Both the cores of the evaporator 104 and heater unit 106 may be required to be larger compared to those of the respective heat exchangers 104, 106 for a single zone HVAC module to provide immediately noticeable cooling to any one zone. It was found that during periods of large discrepancies between cooling needs between zones, the uneven demand between partitioned portions of the core of the evaporator 104 may cause the evaporator 104 to operate inefficiently. For example, if the demand cooling is low for the third and/or fourth zone of the evaporator 104, this may cause the icing of the core of the evaporator 104 which correlates with these zones. The icing of the evaporator 104 may cause refrigerant misdistribution across the core of the evaporator 104, thereby causing the evaporator 104 to provide uneven cooling and to run inefficiently. It's been known to maintain a minimum amount of airflow to counter the icing problems, even when no airflow is required from the rear zones. It has also been know that it is very difficult to achieve airflow separations among the different zones due to the difficulties of fabricating a perfect partition wall through the heat exchangers 104. Finally, the limited use of core of the evaporator 104 reduces the heat transfer effectiveness of the evaporator 104 and causes high irreversibility for the refrigeration system, leading to higher power consumption and Green House Gas emission.

Figure 3:
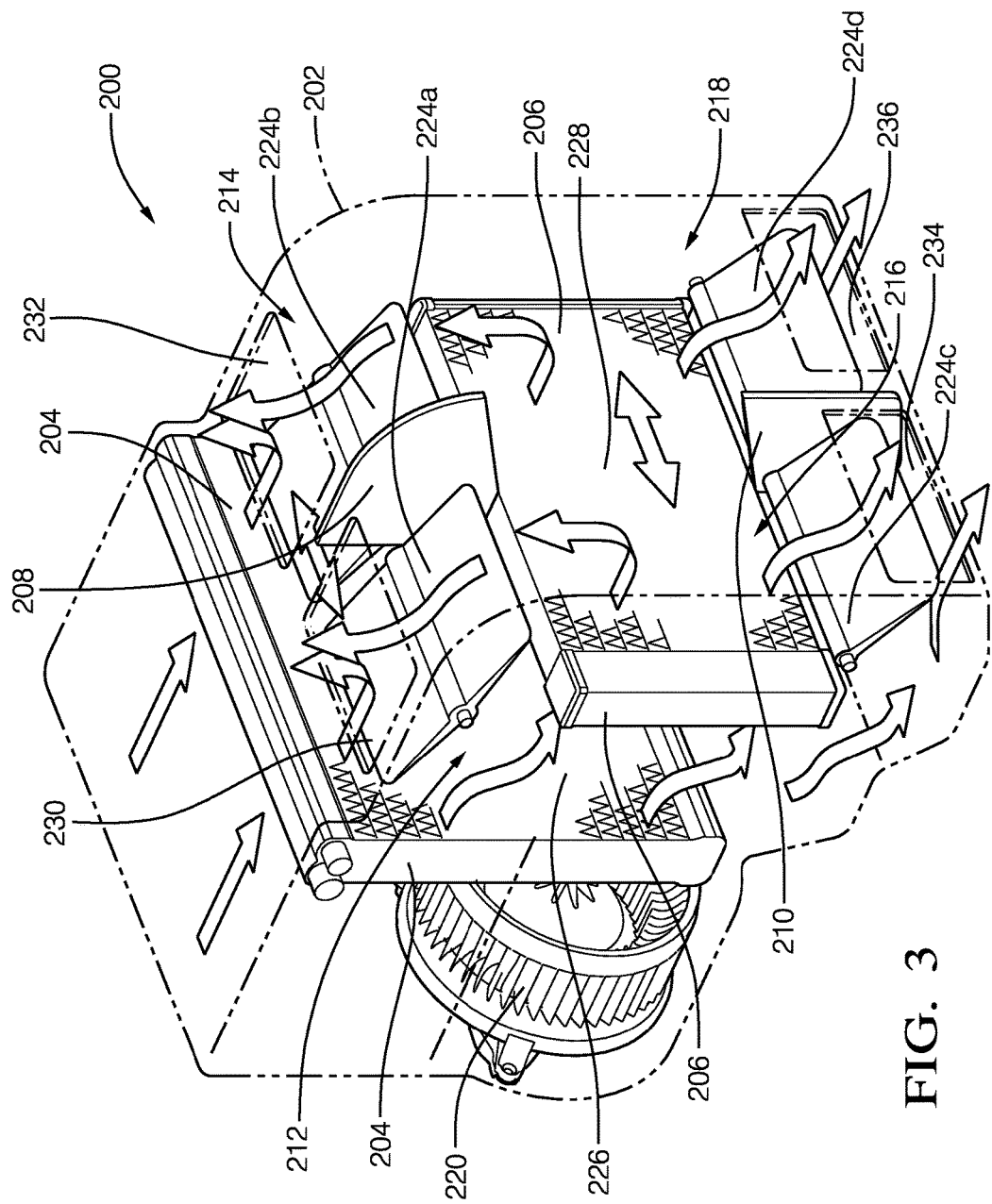
FIG. 3 is a simplified perspective view of an improved HVAC module of the present invention.
Figure 4:
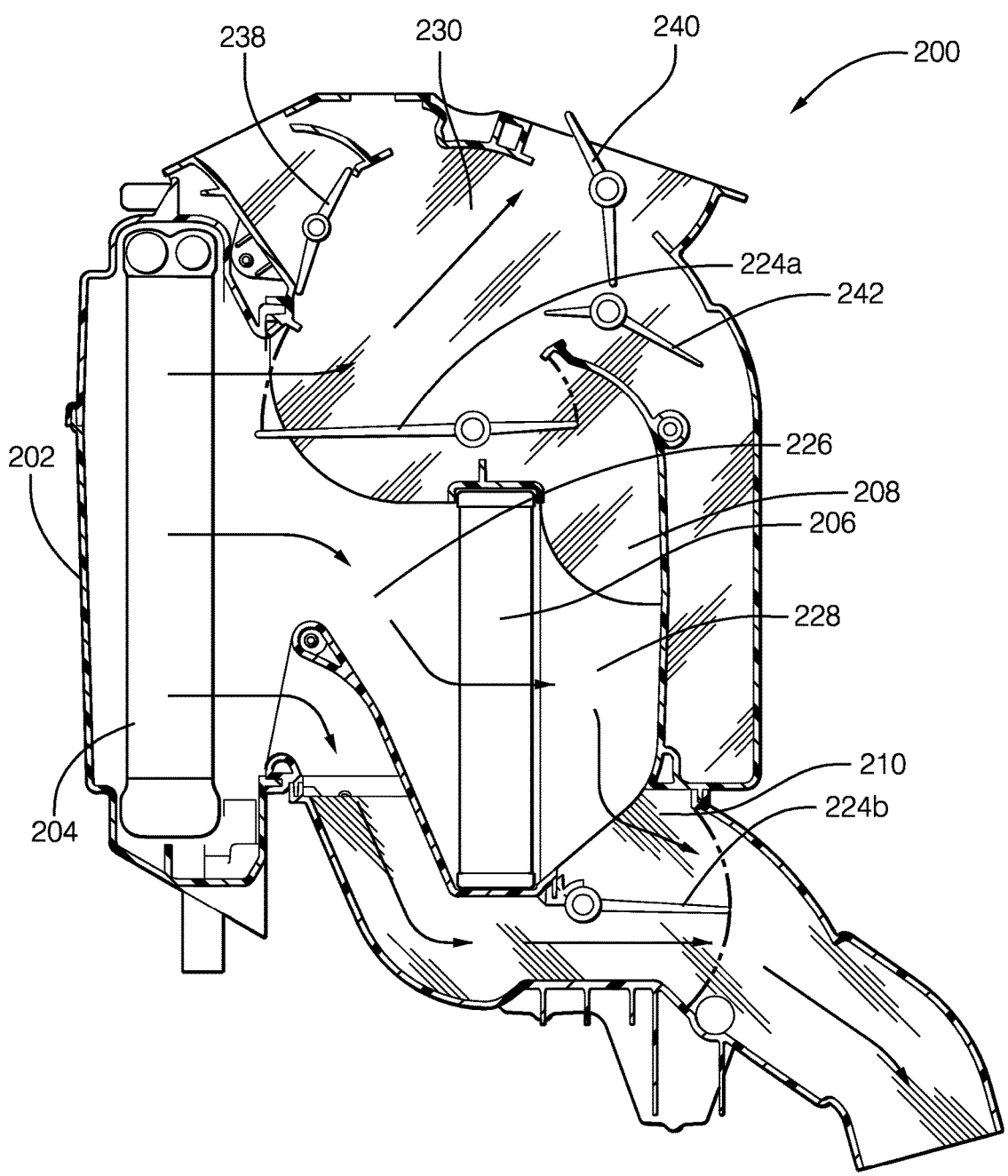
FIG. 4 is an embodiment of an improved HVAC module embodying the features of the HVAC module of FIG. 3.

Shown in FIGS. 3 and 4 is an improved HVAC module 200 having an open architecture. FIG. 3 presents a simplified drawing of the improved HVAC module 200 for clarity of explanation of the features and operations of the improved HVAC module 200. FIG. 4 shows an embodiment of the improved HVAC module 200. Where practical, reference numbers for like components are commonly used among FIGS. 3 and 4. It should be noted that that the terms "upper" and "lower" are not meant to be limiting, but are used to reference the locations of the features with respect to the drawings.

An open architecture HVAC module means, in part, that the cores of the heat exchangers 204, 206 are not partitioned into dedicated zones by the internal partition walls 208, 210 of the HVAC housing 202, and all or a portion of the air flow through the core of each heat exchanger 204, 206 may be intercepted by blend valves 224a, 224b, 224c, 224d, and directed to any one or more zones. In other words, the total core of each heat exchanger 204, 206, as opposed to only a portion of the core of the each heat exchanger 204, 206, can be utilized to condition the air flow to one or more of the zones at all times. Unlike the prior art HVAC module 100 described above, the open architecture HVAC module 200 of the present invention enables super cooling or super heating of any one zone, or enables the delivery of different temperature air to multiple zones. Super cooling or super heating is accomplished by directing the total mass air flow (100% of air flow) exiting the core of the evaporator 204 or heater unit 206 to any one of the multiple zones.

The improved HVAC module 200 includes an HVAC housing 202 containing an evaporator 204 and a heater unit 206 spaced from and downstream from the evaporator 204. A cold air chamber 226 is defined in the HVAC housing 202 between the evaporator 204 and heater unit 206, and a hot air chamber 228 is defined between the heater unit 206 and an interior surface of the HVAC housing 202 downstream of the heater unit 206. Air flow through the evaporator 204 exits directly into the cold air chamber 226 and air flow through the heater unit 206 exits directly into the hot air chamber 228. The HVAC housing 202 defines an air inlet and four air outlets 230, 232, 234, 236; one air outlet for each of the temperature controlled zones for supplying temperature controlled air to the respective zones.

An upper vertical partition wall 208, or first partition wall 208, extends partially into the cold and hot air chambers 226, 228 from an interior surface of the HVAC housing 202 between the first outlet 230 and second outlet 232. The upper vertical partition wall 208 cooperates with the upper portion of the HVAC housing 202 to define a first mixing chamber 212 in fluid communication with the first air outlet 230 on one side of the upper vertical partition wall 208 and a second mixing chamber 214 in fluid communication with the second air outlet 232 on the other side of the upper vertical partition wall 208. Similarly, a lower vertical partition wall 210, or second partition wall 210, extends partially into the cold and hot air chambers 226, 228 from an interior surface of the HVAC housing 202 between the third outlet 234 and fourth outlet 236. The lower vertical partition wall 210 cooperates with the lower portion of the HVAC housing to define a third mixing chamber 216 in fluid communication with the third air outlet 234 on one side of the lower vertical partition wall 210 and a fourth mixing chamber 218 in fluid communication with the fourth air outlet 236 on the other side of the lower vertical partition wall 210.

It should be noted that the improved HVAC module 200 does not include a horizontal partition wall as required by the prior art HVAC module 100. It should also be noted that the vertical partition walls 208, 210 extend only partially into the cold and hot air chambers 226, 228, and do not extend to or through the evaporator 204 and heater unit 206. Each of the mixing chambers 212, 214, 216, 218 is in fluid communication with both the cold air chamber 226 and hot air chamber 228. Disposed in each of the four mixing chambers 212, 214, 216, 218 is a blend valve 224a, 224b, 224c, 224d configured to selectively divert at least a portion of air flow from the cold air chamber 226 and hot air chamber 228 to its respective outlet 230, 232, 234, 236. As opposed to a dual blower requirement of the prior art HVAC module 200 shown in FIGS. 1 and 2, only a single blower 220 is required to induce air through the improved HVAC module 200 to the multiple zones.

Figure 5:
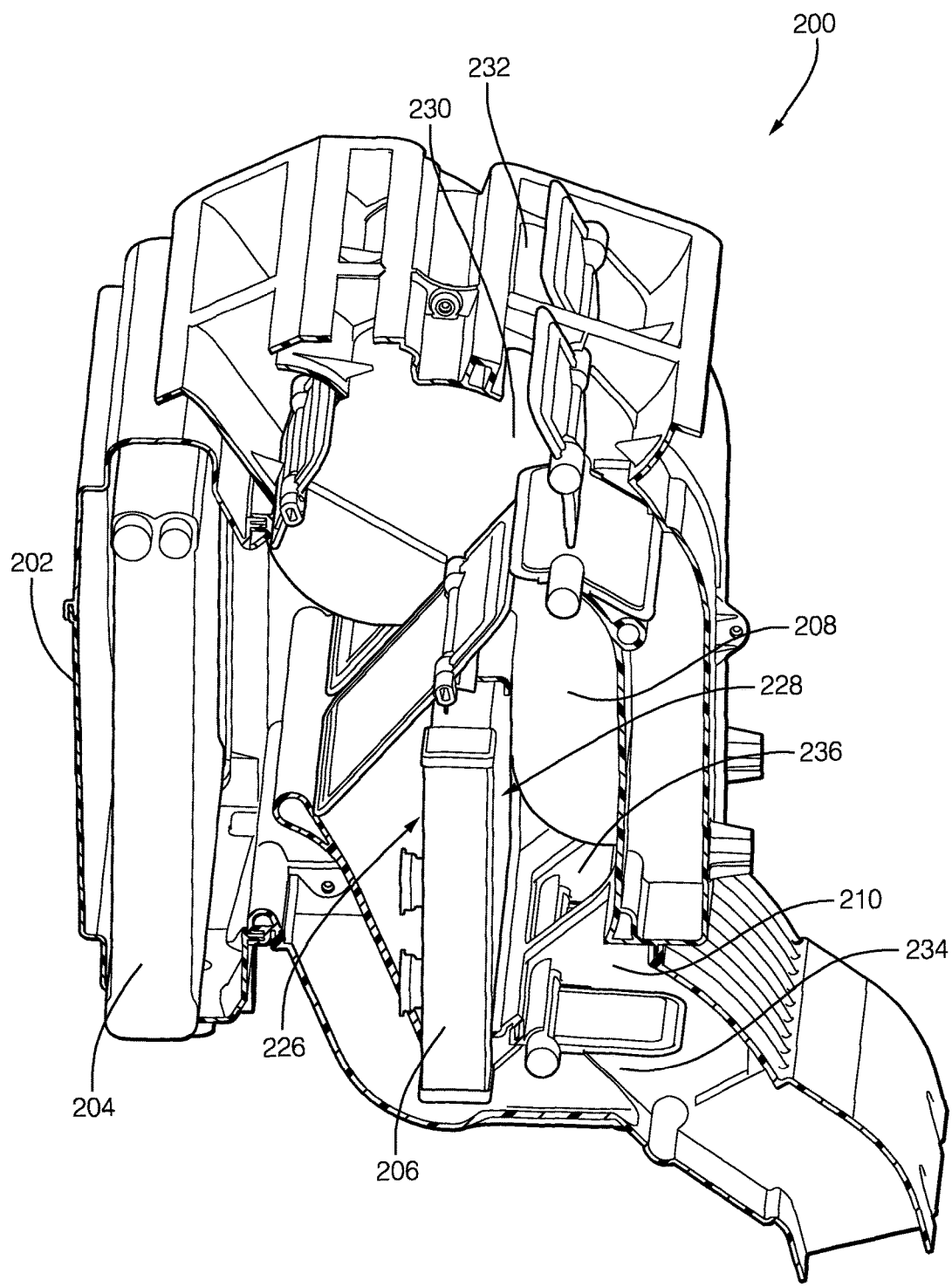
FIG. 5 is perspective partially cutaway view of the improved HVAC module of FIG. 4.

The embodiment of the open architecture HVAC module 200 shown in FIGS. 4 and 5 includes an HVAC housing 202 defining an air inlet 201, a first zone outlet 230 and a second zone outlet 232 adjacent the upper portion of the HVAC housing 202, a third zone outlet 234 and a fourth zone outlet 236 adjacent the lower portion of the HVAC housing 202, a upper partition wall 208 separating the first and second mixing chamber 212, 214, and a lower partition wall 210 separating the third and fourth mixing chamber 216, 218. The second and fourth zone outlets are hidden behind the upper partition wall 208 and the lower partition wall 210, respectively, and therefore are not shown in FIG. 4. Shown downstream of the first zone outlet are a first mode valve 238 for delivering air to the windshield, a second mode valve 240 for delivering air to the dash, and a third mode valve 242 for delivering air to the feet of the driver. Downstream of the third mixing chamber 234 may be mode valves (not shown) for delivering air flow to the torso or feet of the rear passengers.

Referring to FIGS. 4 and 5, an evaporator 204 is spaced from and disposed upstream of a heater unit 206 within the HVAC housing 202. A cold air chamber 226 is defined by the volume of the HVAC housing 202 between the evaporator 204 and the heater unit 206, and a hot air chamber 228 is defined by the volume of the HVAC housing 202 between the heater unit 206 and a portion of the interior surface of the HVAC housing 202 down steam of the heater unit 206. A single blower assembly 220 is provided to draw air into the HVAC module 200 to be conditioned and conveyed to the individual zones. The mass flow rate and velocity of air flow to each zone may be controlled by the combination of the speed of the blower and airflow control valves provided in the vent outlet to each of the zones. The blower assembly 220 may draw in a stream of air external to the vehicle or a stream of recycle air from within the vehicle.

The temperature blend valves 224a, 224b, 224c, 224d of each chamber may selectively intercept one of the hot and cold air streams, or a combination of both, from the cold and hot air chambers 226, 228, respectively, to provide the desired temperature to the zones. The zonal specific airflow rate control after mixing is achieved by the coordination of the blower, current zone flow control valve, and the balancing of other zonal flow control valves. A benefit of this open architecture is that the total capacity of the evaporator 204 and heater unit 206 may be utilized to condition the air for any one of the zones, as well as providing variable air flow to the zones. Another benefit is that by selectively opening and closing the airflow control valves, the total air flow through the heat exchangers 204, 206 may be directed to any one of the zones. The mode valves may be coordinated to direct 100 percent of the zone one air flow to one of the defrost vents, passenger vents, or floor outlets.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

What is claimed is:

1. An HVAC module, comprising:
a housing defining an air inlet, a first air outlet, and a second air outlet adjacent said first air outlet;
a first heat exchanger disposed within said housing downstream of said air inlet;
a second heat exchanger disposed within said housing downstream of said first heat exchanger;
a first air chamber defined in said housing between said first heat exchanger and said second heat exchanger;
a second air chamber defined in said housing between said second heat exchanger and an interior surface of said housing downstream of said second heat exchanger;
a first partition extending into said first air chamber and said second air chamber from an interior surface of said housing between said first air outlet and said second air outlet;
wherein said first partition is spaced from said first heat exchanger and said second heat exchanger such that each of said first air outlet and said second air outlet are in fluid communication with both of said first air chamber and said second air chamber.

2. The HVAC module of claim 1, wherein:
said first partition wall cooperates with said housing to define a first mixing chamber in fluid communication with said first outlet on one side of said first partition wall and a second mixing chamber in fluid communication with said second outlet said other side of said first partition wall, wherein each of said first and second mixing chambers are in fluid communication with both of said first air chamber and said second air chamber.

3. The HVAC module of claim 2, further comprising a first blend valve disposed in said first mixing chamber, wherein said first blend valve is configured to selectively direct air flow from said first air chamber and said second air chamber to said first air outlet.

4. The HVAC module of claim 3, further comprising a second blend valve disposed in said second mixing chamber, wherein said second blend valve is configured to selectively direct air flow from said first air chamber sand said second air chamber to said second air outlet.

5. The HVAC module of claim 4, wherein:
said housing further defines a third air outlet and a fourth air outlet adjacent said third air outlet.

6. The HVAC module of claim 5, further comprising a second partition extending into said first air chamber and said second air chamber from an interior surface of said housing between said third air outlet and said fourth air outlet.

7. The HVAC module of claim 6, wherein said second partition is spaced from said first heat exchanger and said second heat exchanger such that each of said third air outlet and said fourth air outlet are in fluid communication with both of said first air chamber and said second air chamber.

8. The HVAC module of claim 7, wherein:
said second partition wall cooperates with said housing to define a third mixing chamber in fluid communication with said third outlet on one side of said second partition wall and a fourth mixing chamber in fluid communication with said fourth outlet said other side of said second partition wall, wherein said third and fourth mixing chambers are in fluid communication with said first air chamber and said second air chamber.

9. The HVAC module of claim 8, further comprising a third blend valve disposed in said third mixing chamber, wherein said third blend valve is configured to selectively direct air flow from said first air chamber and said second air chamber to said third air outlet.

10. The HVAC module of claim 9, further comprising a fourth blend valve disposed in said fourth mixing chamber, wherein said fourth blend valve is configured to selectively direct air flow from said first air chamber sand said second air chamber to said fourth air outlet.

11. The HVAC module of claim 10, further comprises no more than one blower assembly configured to induce air flow through said housing from said inlet to at least one of said outlets.

12. The HVAC module of claim 11, wherein said first heat exchanger is an evaporator and said second heat exchanger is a heater unit.

* * * * *